United States Patent [19]

Papai

[11] Patent Number: 5,163,327
[45] Date of Patent: Nov. 17, 1992

[54] PRESSURE SENSING ELEMENTS

[75] Inventor: Richard A. Papai, South Bend, Ind.

[73] Assignee: Johnson Service Company, Milwaukee, Wis.

[21] Appl. No.: 639,919

[22] Filed: Jan. 10, 1991

[51] Int. Cl.[5] .............................................. G01L 7/08
[52] U.S. Cl. .................................. 73/715; 92/103 SD
[58] Field of Search ............... 73/726, 715, 716, 717, 73/718, 719, 720, 721, 722, 723, 724, 725, 726, 727, 728, 729; 92/103 SD

[56] References Cited

U.S. PATENT DOCUMENTS

| | | | |
|---|---|---|---|
| 4,260,695 | 4/1981 | Medem et al. | 525/466 |
| 4,599,594 | 7/1986 | Siman | 336/92 |
| 4,772,263 | 9/1988 | Dorman et al. | 128/DIG. 12 |
| 4,781,535 | 11/1988 | Frawley et al. | 340/605 |
| 4,825,166 | 4/1989 | MacGugan | 324/244 |
| 4,834,678 | 5/1989 | Emadi et al. | 439/686 |
| 4,852,581 | 8/1989 | Frank | 73/726 |
| 4,861,857 | 8/1989 | Kricheldorf et al. | 528/170 |
| 4,863,767 | 9/1989 | Garg et al. | 428/1 |
| 4,866,989 | 9/1989 | Lawless | 73/726 |
| 4,871,817 | 10/1989 | Rock | 525/425 |
| 4,880,591 | 11/1989 | Baba | 264/327 |
| 4,881,055 | 11/1989 | Capp et al. | 337/404 |
| 4,944,487 | 7/1990 | Holtermann | 251/129.17 |
| 4,953,825 | 9/1990 | Osumi et al. | 251/129.17 |
| 4,958,661 | 9/1990 | Holtermann et al. | 137/843 |

OTHER PUBLICATIONS

Johnson Controls Bulletin No. 3496-E.
Johnson Controls Bulletin No. 3848-A.
Johnson Controls Bulletin No. 3864-B.
Hoechst Celanese Corporation VECTRA Automotive Industry Brochure (TVC 7b/5M-88).
Hoechst Celanese Corporation VECTRA Electronics Applications Brochure (VC-7).
Hoechst Celanese Corporation VECTRA An Introduction Brochure (VC-3).
Hoechst Corporation VECTRA Liquid Crystal Polymer (VC-4).

Primary Examiner—Donald O. Woodiel
Attorney, Agent, or Firm—Foley & Lardner

[57] ABSTRACT

Pressure vessel components of a sensing element are formed from liquid crystal polymers. Individual LCP components may be ultrasonically adhered to one another to form a hermetic seal. In the preferred embodiment, a metal tube is hermetically sealed to a pressure vessel cup by molding an LCP resin around a cleaned and heated tube to form a hermetic seal. Also in the preferred embodiment, the sensing element includes a single convolution diaphragm formed under heat and pressure using a polyimide film.

15 Claims, 2 Drawing Sheets

PRESSURE SENSING ELEMENTS

BACKGROUND OF THE INVENTION

1. Field of the Invention

The present invention relates generally to the art of pressure sensing elements, and more specifically to the use of modern engineering plastics for certain components of such devices. Still more specifically, the present invention relates to such devices where seals are hermetically formed between the several liquid crystal polymer components and between certain liquid crystal polymer components and certain metal components and/or certain polyimide film components, the end product being useful in a wide variety of environments and for sensing a wide variety of pressures, e.g. from 20 inches of vacuum to more than 500 psig. In its most specific form, the present invention also employs a polyimide, single convolution diaphragm.

2. Description of the Prior Art

Pressure controls for a variety of applications have been made for a number of years by the assignee of the present invention. The types of controls with which the present invention is concerned have been sold under the PENN trademark and include pressure controls for refrigeration and air conditioning equipment. In such devices a tube is connected to the environment to be measured and to a control housing through a fitting known to the trade as a controller "cup". Within the cup, a diaphragm is spring biased and mounted in such a way that a bushing moves in response to the pressure of the fluid or gas contained within the environment. Such movement can be simply read or used by the controller to carry out certain control functions, which in and of themselves are known and form no part of the invention.

As illustrated in the three product bulletins supplied with this application (3496-E, 3848-A and 3864B), the controllers may be variously configured in single pole or double pole arrangements, and they are designed for use with different fluids (e.g. known refrigerants such as R-12, R-22, R-500, R-502 and R-134A) and for a variety of pressure levels (e.g. from 20 inches of vacuum to more than 475 psig). These controls are designed for use as operating controls where a small pressure differential may be detected, e.g. 5 psi, typically direct controlled to AC motors with numerous setting choices, either CLOSE High - OPEN Low or OPEN High - CLOSE Low.

While the controls described above and in the accompanying literature function very efficiently, they do have several drawbacks, especially in the nature of their materials of construction and methods of manufacture. Presently most, if not all commercial pressure vessels used for controllers as well as other devices, utilize steel stampings, turned steel or brass, iron or aluminum castings and welding, brazing, soldering, screwing or crimping processes are employed for securing fittings, brackets or tubes to the pressure vessel. These materials and processes are very expensive and currently result in significant scrap.

In addition to the combining of such parts in a device, such as the aforementioned controllers, it is necessary to couple the pressure vessel (in this case the cup) to the tubing by a process which will result in a hermetic seal or joint. Currently this is accomplished via pinching a relatively high modulus material such as steel or brass against a softer material, such as rubber or plastic, or by using a third material such as an adhesive, O-ring or braze mat between two high modulus materials. O-rings are the preferred choice because the relatively inexpensive part can be loaded to give acceptable results. O-rings are not suitable where the temperatures or clamping forces do not permit their use, in which case an adhesive may be used. However, curing problems may be encountered with adhesives, or they may not be acceptable in certain harsh environments where chemical or thermal instability may cause premature failure.

Brazed joints are expensive per piece unless large furnaces are available. The latter obviously increases operating costs. Laser welding also provides a good joint, but expensive equipment is necessary and the process is slow and requires extremely clean parts. Soldering uses expensive material and is considered to be quite slow. Tig welding is cheaper, but is more typically used for securing than sealing. Lap welding automation has been slow to develop and suffers from generally slow through-put and unacceptably high joint temperatures. These joint costs are normally justified because of the high reliability required. Joint integrity is especially important in the refrigeration industry, where inoperability and CFC leakage are both substantial concerns. Moreover, heretofore brazing, welding and soldering have been viewed as the only techniques which are durable enough to survive both the harsh chemical environment and the abusive vibration conditions which exist in refrigeration equipment. Testing by agencies, such as Underwriter's Laboratory, also has dictated the use of mechanical type joints in most past systems.

A need therefore exists for pressure control devices which can be prepared more quickly and just as reliably as those currently on the market. Material and labor cost savings would both be highly desirable.

In fields other than those with which the present invention is concerned, new engineering plastics have been developed for a variety of end use applications. One type of engineering plastic is the "LCP" type, i.e. liquid crystal polymers. These resins will be discussed in greater detail below in connection with a description of the preferred embodiment, but generally they are known as highly resistant materials which exhibit toughness, dimensional stability, flame resistance and ease of processing. They are inert to such chemicals as acids, bases, aromatic and halogenated hydrocarbons, etc. They also resist stress cracking in the presence of most chemicals at elevated temperatures and pressures.

One manufacturer of LCP is Hoechst Celanese Corporation which markets a number of such resins under the VECTRA ® trademark. That company describes its LCP resins as wholly aromatic polyesters useful for injection molding and extrusion opportunities, especially when reinforced with fibers, fillers and the like. Principal physical characteristics are said to be V-O ratings down to 1/64", high strength and modulus, chemical resistance (even under stress), controllable, very low co-efficient of linear thermal expansion, high dielectric strength and high heat deflection temperature. Molding advantages are said to be fast cycle times, low shrinkage, low melt viscosity, resistance to warpage, etc. Usage temperatures are rated between −325° F. to +460° F. VECTRA ® polymers are recommended by their manufacturer for electronic applications, relays, housings, switches, fiber optic strength members, automotive components, motor components, shafts, housings, microwave equipment, watch components, etc. Four technical brochures from Hoechst Celanese Corporation are supplied herewith (TVC 7B/5M-88, VC-7 and VC-3 and VC-4).

Several applications for LCP type resins have also been disclosed in the patent literature. See, for example, U.S. Pat. No. 4,825,166 issued Apr. 25, 1989 to MacGugan for "Bobbin For A Magnetic Sensor". In this patent, the plastic frame for carrying a magnetic core is made from poly-ether-ether-ketones, an LCP class material Another use is shown in U.S. Pat. No. 4,880,591 issued Nov. 14, 1989 to Baba for "Method For Manufacturing Speaker Vibration Member". In this patent, at least ten percent (10%) of a thermoplastic LCP with 3–40% fiber or flake fill is used as the main structural material for a sound speaker.

An LCP is used as a molded thermoplastic substrate in a "Pressure Transducer With Conductive Polymer Bridge" which is the subject of U.S. Pat. No. 4,852,581 issued Aug. 1, 1989 to Frank. Conductive polymers provide the resistive elements of a Wheatstone bridge in this device.

A "High Voltage Contact Assembly" is described in U.S. Pat. No. 4,834,678 issued May 30, 1989 to Emadi, et al. Housing sub-assemblies are ultrasonically welded in this device which may be made from LCP materials.

An "Electrical Inductive Apparatus" is described in U.S. Pat. No. 4,599,594 issued Jul. 8, 1986 to Simon. The winding tube of this device may be made from LCP class resins, and sub-assemblies thereof may be permanently joined by ultrasonic welding.

Several examples of patents which describe LCP resins themselves include U.S. Pat. No. 4,871,817 issued Oct. 3, 1989 to Rock and entitled "Polyetherimide-Liquid Crystal Polymer Blends", U.S Pat. No. 4,260,695 issued Apr. 7, 1981 to Medem, et al. for "Process For The Preparation Of Aromatic Polyesters" and U.S. Pat. No. 4,861,857 issued Aug. 29, 1989 to Kricheldorf, et al. and entitled "Thermotropic Polyesterimide From N-Carboxyalkylene Trimellitimide Having Excellent Processibility And Process For Their Production And Their Use For The Production Of Moldings, Filaments, Fibers And Films".

A Hoechst Celanese Corporation patent describes a bonding processing using Ph adjustment (U.S. Pat. No. 4,863,787 issued Sep. 5, 1989 to Gerg, et al.), and a "High Temperature Fluid Sensor" is shown in U.S. Pat. No. 4,881,055 issued to Capp, et al. on Nov. 14, 1989. In the latter, an LCP is used as a housing material for electrical conductors which project from opposite ends of the body and which are shrouded with and electrically connected by fusible material that has been molded in place. Nowhere are LCP's suggested for use as a pressure vessel, either in existing literature or patents.

SUMMARY OF THE INVENTION

In the present invention, an LCP resin is used to fabricate certain parts of a pressure vessel, e.g. the cup and other components of a pressure control device of the type described above. The hermetic seal formed previously by mechanical operations or third materials (i.e. brazing or welding) is formed in the preferred embodiment of the invention by molding operations and/or by ultrasonic welding techniques. A feature of the present invention is providing hermetic seals at a high success rate employing labor saving operations.

In another feature of the preferred embodiment, the diaphragm of a pressure control is made from a polyimide material in the form of a single convolution diaphragm and is attached to the LCP enclosure component by a suitable attachment technique, e.g. by an adhesive. A method for forming such diaphragm is also disclosed.

In a further feature of the preferred embodiment, an LCP disc plate is welded ultrasonically to the enclosure to serve as a boundary for the diaphragm, and a bushing is positioned on one side of the diaphragm to transfer the governed movement as its position changes relative to the pressure exerted on the other side of the diaphragm.

In a still further feature of the preferred embodiment, the LCP material is molded around the pressure control capillary tube to provide a hermetic seal therebetween. The fitting resulting from the molding operation may be used as a connector to a high or low pressure transducer, using ultrasonic welding as the attachment technique if the fitting and the cup to which the fitting is attached are both made from the LCP. The molding method most preferably includes the step of heating the capillary to the temperature of the molten LCP, e.g. by direct current heating. Pre-cleaning by plasma etching is also disclosed as a method step in the sealing process to optimize the opportunity for achieving a hermetic seal.

The resulting pressure vessel with hermetic seal is ideally suited for use in harsh environments, e.g. in refrigeration applications, automotive applications and the like. Other features of the present invention will appear to those skilled in the art after reading the present specification or will be described in the remaining parts hereof, all of which are deemed to fall within the scope of the application if they fall within the scope of the claims which follow.

DESCRIPTION OF THE DRAWINGS

In the drawings, like reference numerals are used to illustrate like components.

DETAILED DESCRIPTION OF THE PREFERRED EMBODIMENT

Figure 1:
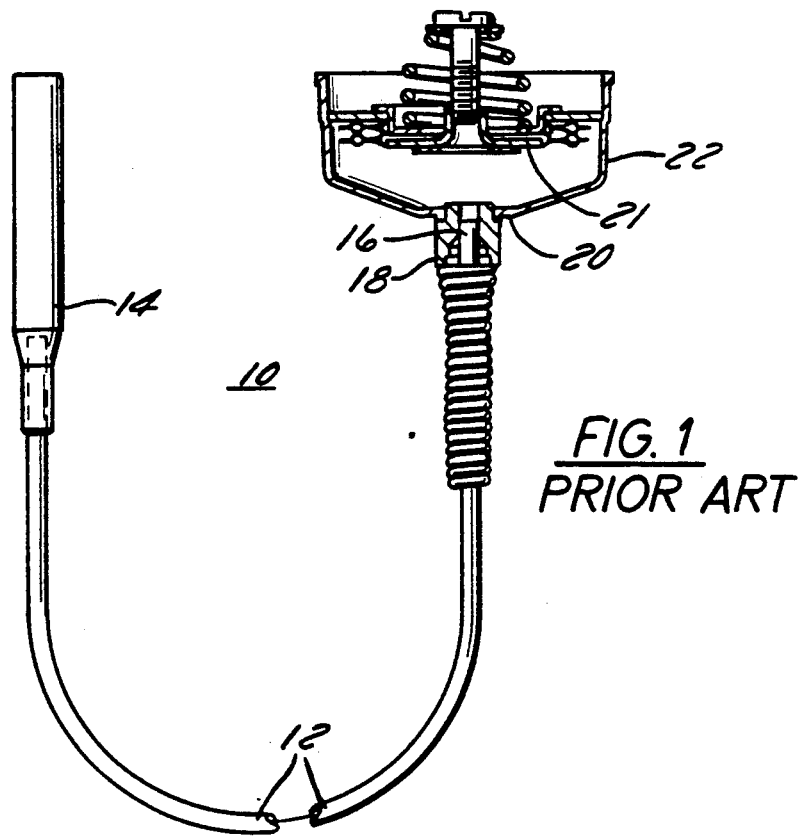
FIG. 1 is a side view, partially in section, of the pressure control device of the prior art employing a stainless steel housing and generally illustrating one environment in which the present invention may be employed.

Before proceeding to a description of the preferred embodiment of the present invention, it will be helpful to generally describe the components of a prior art pressure control device 10 which is illustrated in general form in FIG. 1 and which is of the type previously sold by the assignee of the present invention under the PENN trademark (see the aforementioned technical literature which is expressly incorporated herein by this reference).

Control device 10 includes a coil of tubing 12, e.g. copper tubing, the free end 14 of which is suitably coupled into an environment, the pressure of which is to be sensed. In a typical application, end 14 would be coupled into the refrigerant system of an air-conditioning system (not shown). The second end 16 of tubing 12 is hermetically sealed to an inverted cup 18 of the control device. Cup 18 in turn is attached to the base 20 of a control housing 22, the face of which might have pressure indicating means shown thereon as is illustrated in the aforementioned product brochures.

At this point, the internal components of the control device 10 will not be described in detail, as they will be so described in connection with the present invention. It is sufficient at this point to state that a stacked bellows, spring biased diaphragm 21 is located in control housing 22 and that a bushing is located adjacent thereto for movement upwardly and downwardly (when the controller is configured as in FIG. 1) in response to the pressure existing on the opposite side of the diaphragm, as admitted to control housing 22 through tubing 12. In such prior devices, the control housing, bushings and other elements have typically been made from steel (most typically a stainless steel) and the various components have been attached using certain of the more costly joining and sealing techniques described above in connection with the background of the invention. Single, convolution diaphragms made from stainless steel or beryllium copper have been employed for these types of devices, but suffer from numerous drawbacks as will be discussed further below.

Tubing 12 is typically brazed to the stainless steel control housing 22, but even using a high level of manufacturing care, a hermetic seal may not result. During testing at the time of manufacture, those parts which are not properly sealed must be discarded or repaired, resulting in lost time and added material expense. These problems are addressed in the present invention by changing materials for certain components and in some instances changing the manufacturing techniques as well.

Figure 2:
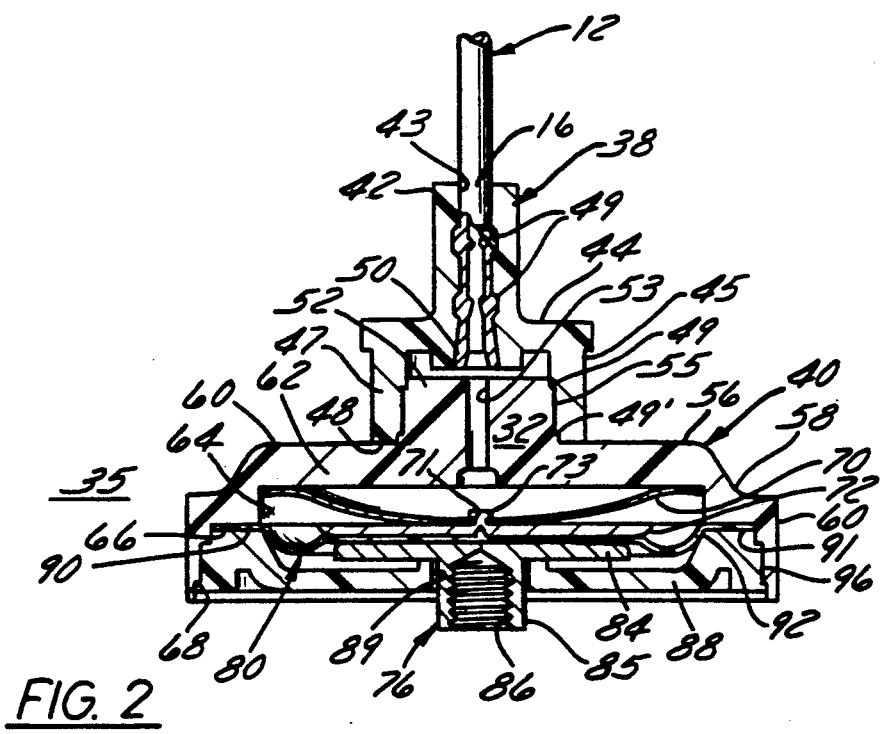
FIG. 2 is a cross-sectional view of a sensor control device made according to the preferred embodiment of the present/invention.

The present invention is illustrated in FIG. 2 which shows only a portion of the tubing 12 and which does not show the control housing 22. The latter would be similar to the housing 22 shown in FIG. 1. Tubing 12 is still made from copper (in the preferred embodiment) and the free end thereof (not shown) would be suitable coupled in use to the system whose pressure is to be sensed. Its second end 16 in this FIGURE is shown attached to a pressure vessel 32 of the control device 35 according to the preferred form of the invention. The particular material used for the pressure vessel 32 is an engineering plastic of the type generally known as an LCP resin. The present inventor has found two Vectra ® resins to be especially suitable for low and high pressure cups (20 inch vacuum to 150 psig and 100 to 475 psig respectively). These materials and certain properties the manufacturer has listed for them are shown below in Table 1. The preferred low pressure material is Vectra ® A130 and the preferred high or low pressure connector is Vectra ® B130.

TABLE 1

| Property | A 130 | B 130 |
| --- | --- | --- |
| Specific Gravity | 1.61 | 1.61 |
| Water Absorption % | 0.02 | 0.02 |
| Mold Shrinkage Flow/ Transverse 4" Disk % | 0.1/0.2 | 0.0/0.1 |
| Tensile Strength at Break $10^3$ psi | 30 | 32 |
| Tensile Modulus $10^6$ psi | 2.4 | 3.5 |
| Elongation at Break % | 2.2 | 1.2 |
| Flexural Strength $10^3$ psi | 37 | 43.5 |
| Flexural Modulus $10^6$ psi | 2.1 | 2.7 |
| Compressive Strength $10^3$ psi | 20 | 28 |

TABLE 1-continued

| Property | A 130 | B 130 |
| --- | --- | --- |
| Compressive Modulus $10^6$ psi | 1.7 | 2.1 |
| Shear Strength $10^3$ psi | 17.8 | 19.1 |
| Izod Impact Strength: Notched ftlb/in$^2$ | 2.8 | 1.7 |
| Coeff. of Linear Thermal Expansion cm/cm/°C. −50° C. to 200° C. Flow | | |
| Direction × $10^{-6}$ | 5 | 2 |
| Transverse to Flow | 65 | 50 |

Pressure vessel 32 is actually made from two components, a first receiver cap 38 and a second main cup 40. Receiver cap 38 is made in a molding process soon to be described and includes a first tubular portion 42 having a central bore 43 for receiving end 16 of tubing 12, a radially directed web 44 extending outwardly from tubular portion 42 and an annular, cylindrical attachment ring 45 having an inner wall 47 and terminating in a circular end 48. In the preferred embodiment, tubing 16 includes a pair of spaced apart, annular, radially extending ribs 49 near its end 50, and end 50 is flared slightly. The present inventor has determined that a high percentage of hermetic seals for the cap 38 and embedded tubing 12 can be achieved if the tubing is heated to about the same temperature as that of the LCP casting resin, in the range of about 575° F. Heating may be accomplished by using direct current amperage from a 12 volt current source. It is also helpful in achieving a hermetic seal to preclean the metallic tubing 12, such as by plasma etching to assure a high throughput. Using these two processing techniques, success rates of 98% are achievable, as compared to the 75% (or less) success rate that might be achieved without tube preheating and without plasma etching.

The main cup 40 is also made from the selected LCP plastic by a molding technique. Cup 40 includes a first cylindrical plug portion 52 having a central bore 53 therethrough. The diameter of portion 52 is selected to be received by wall 47 of attachment ring 45. A web 56 extends radially from portion 52 and terminates in another annular cylindrical portion 58. Portion 52 is preferably sized so that its inner end 53 is spaced slightly from the flared end 50 of tube 12 and the bore 53 of portion 52 is preferably axially aligned with that of tubing 12. While adhesives may be employed to join the outer wall 55 of portion 52 to the wall 47 of ring 45, the preferred attachment technique is ultrasonic welding. If the latter is employed, undercutting of wall 47, as is shown at 49 and 49′, is desirable. Ultrasonic welding is known, and its use in joining LCP components does not, in and of itself, form part of this invention.

Web 56 and cylindrical portion 58 include an outer surface 60 and an inner surface comprised of a first generally planar disc 62, a step 64 perpendicularly extending from the outer edge of disc 62, a shoulder ring 66 aligned in a plane generally parallel to disc 62 and another step 68 extending perpendicularly from the outer edge of ring 66. The shape is similar to that employed for the steel sensing elements of the prior art. Received within the cavity defined by areas 62, 64, 66 and 68 are several other sensor components which are the same as those previously employed, including a stainless spring 70 creating a negative pressure bias, a spring button 72 having a central nub 73 received in the central aperture 71 of spring 70 and a bushing 76 disposed on the opposite side of spring button 72 from the inlet bore of the cup 35. Spring button 72 transposes motion caused by the pressure sensed by the system onto the next component to be described, i.e. the diaphragm 80.

In the illustrated embodiment, the diaphragm 80 is of the single convolution type and is made of a DuPont polyimide called KAPTON, but before proceeding to the characteristics of the diaphragm and a description of a preferred method of manufacture, it will be helpful to complete the description of the preferred sensor 35. Located on the opposite side of the diaphragm 80 from spring button 72 is a sensor bushing 76 having a circular disc 84 and a generally cylindrical and centrally located extension 85. Extension 85 includes a threaded hole 86 for receiving the sensing or measuring device as is known with prior systems. Bushing 76 is retained by a disc plate 88 which extends radially about a central aperture 89 designed to sliding receive extension 85. Disc plate 88, in the preferred embodiment, is also made from an LCP resin and is formed with an annular projection 90 around its periphery configured to sandwich the outer edge 91 of diaphragm 80 between itself and the shoulder 66 of cup 40.

In the preferred manufacturing process, it is desirable to first adhere the diaphragm 80 to shoulder 66 using solvent cleaning and plasma etching to ensure good wetting between the surface and an epoxy adhesive. The disc plate is inserted and the outer edge 96 of projection 90 adhered to step 68 of cup 40 using ultrasonic welding techniques (with under cutting if desired) as has been previously disclosed for other LCP-LCP component adhesion. Following this step, an oven cure is used to set the adhesive.

The LCP components described above may be made from 100% resin or may be filled with fillers known to the art. We have successfully employed 30% glass fiber filling in prototype systems.

As noted in FIG. 2, the disc plate projection 90 is arranged with shoulder 66 so as to provide a contact of the edge 92 of diaphragm 80 at the radius of its convolution, to prevent point contact and to enhance system accuracy. The diaphragm itself is formed with a single convolution, from a 0.005" thick KAPTON film in the preferred form for low pressure sensors and 0.011" thick KAPTON film for the high pressure system.

Proceeding now to a more detailed description of the diaphragm 80, it is desirable to obtain a relatively large stroke for the diaphragm, while maintaining a spring rate equal to or lower than the spring rate of prior steel bellows diaphragm designs. The diaphragm, like other components of the system, must be resistant to the chemical environments to which it will be subjected and must, under the conditions employed here, possess the following properties:
1. Large (e.g., 0.080 inch stroke) with long life expectancy;
2. Low spring rate;
3. Less than 3% hysterisis with over pressure;
4. Consistent stiffness between −40° F. to 165° F.;
5. Ease of assembly with a high success rate;
6. Good, controllable processability; and
7. Low drift over the life of the diaphragm.

Figure 3:
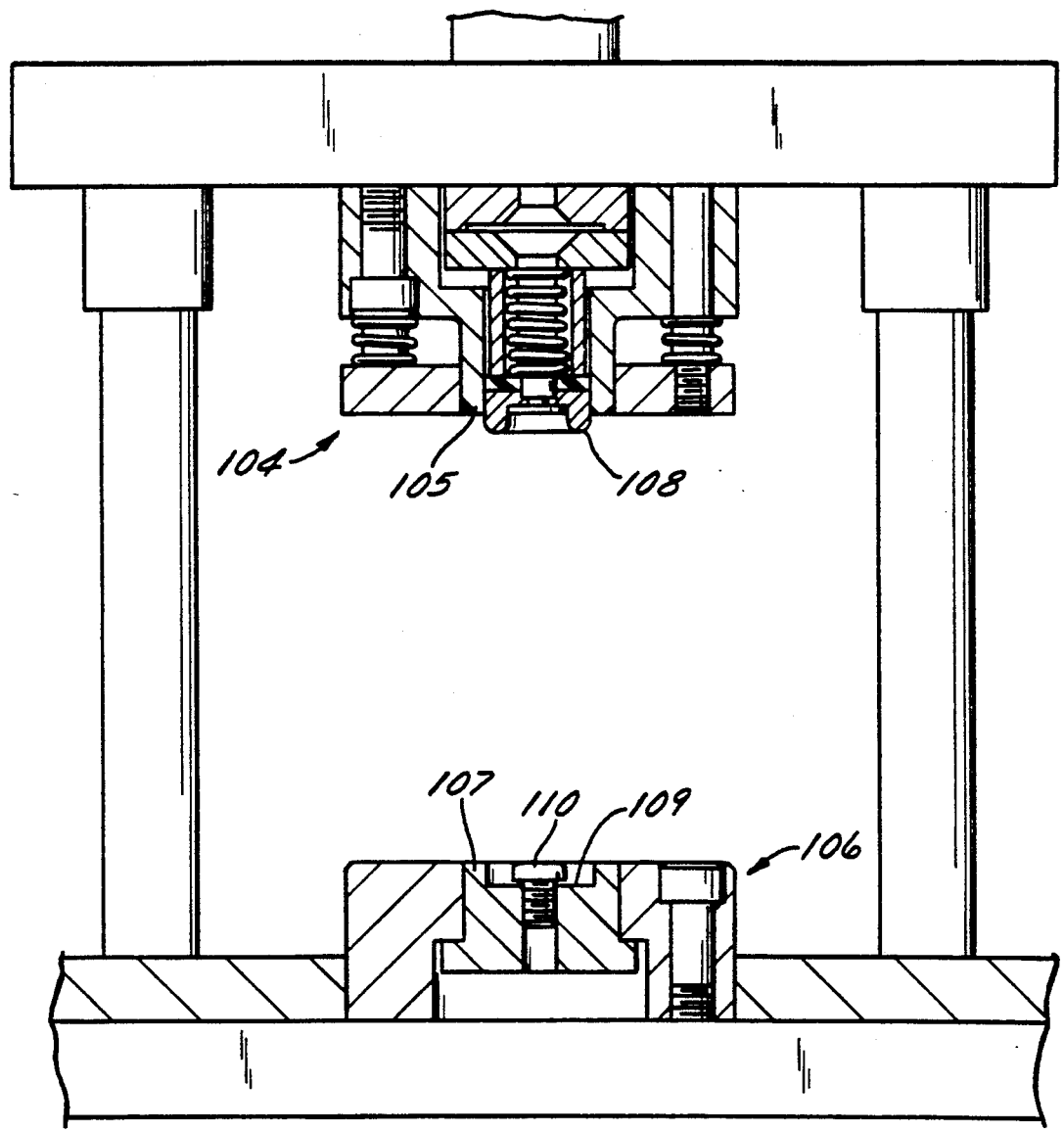
FIG. 3 is a sectional view of a die assembly used for the manufacture of a single convolution, polyimide film according to the present invention.

After reviewing numerous materials which might fulfill these stringent process requirements, most of the well-known engineering plastics were ruled out, but it was noted that certain polyimides, including those sold under the tradename KAPTAN by DuPont or UPILEX by ICI Chemicals appeared promising. The film of choice for the present invention is DuPont's KAPTAN 500 VN. A description of how it is formed will be described by reference to FIG. 3. The film used for low pressure sensors, having a thickness of 0.005 inches, is stretched its final shape using pressure, heat and a lubricant to form a stable diaphragm meeting the aforementioned criteria. Polyimide materials will work harden if they are formed beyond their elastic limits, which results in a shortened lifetime. In the present invention, the film 80 is clamped between die faces 105 and 107 of respective die elements 104 and 106 sufficiently to prevent slippage. A punch 108 which mimics the shape of the desired convolution proceeds to push the diaphragm material into a void area 109 in die 107 and around a die button 110 supported thereby.

Oil, or another suitable lubricant, is used during the stretch forming operation to distribute the stress loads over the whole surface being stretched. Without a suitable lubricant, 50% or more of the stretching occurs only between the load point of the punch 108 and the maximum stress point. Use of oil avoids overstressing or overthinning where concentrated areas of stress may otherwise occur.

Heat is also used during forming to give the stretched material a memory set. The formed or stretched shape produced is only stable to that memory set temperature and varies with applied pressure or forces. I prefer to maintain a minimum of 100° F. differential between the stretching temperature and the maximum operating temperature of the device. If the stretching required is close to the ultimate elongation of the material, a larger differential temperature would be permitted. The heat acts as a catalyst to stabilize the internal residual stresses caused during stretching within the elastic range, and the finished product must be stretched and heat stabilized within the material's ultimate elongation limits while having a sufficiently high forming temperature that no external pressures or ambient temperatures caused the diaphragm to change its shape. In our most preferred embodiment the dies are heated to about 250° F.

While a preferred embodiment has been described in considerable detail in this application, numerous variations could be made thereto without departing from the intended scope of the invention by one skilled in the art having knowledge of the present specification. LCP materials, fillers and adhesives, other than those specifically referred to in the description of the preferred embodiment, could be used and the selection could vary widely depending on system size and pressures which might be encountered. Accordingly, the invention is not to be limited by the description above, but is to be limited solely by the claims which follow.

What is claimed is:

1. A pressure sensing element comprising a pressure vessel, conduit means for coupling said sensing element to an environment, a diaphragm contained within said pressure vessel and wherein said pressure vessel includes at least one structural component comprising a liquid crystal polymer, and wherein said conduit means is hermetically joined to said sensing element by molding a liquid crystal polymer component about said conduit means.

2. The sensing element of claim 1 wherein said sensing element includes a cup as part of said vessel and said cup is formed of a liquid crystal polymer.

3. The sensing element of claim 2 wherein said liquid crystal polymer is filled.

4. The sensing element of claim 1 wherein said sensing element comprises a plurality of structural components forming said pressure vessel, at least two of said elements comprising a liquid crystal polymer.

5. The sensing element of claim 4 wherein said liquid crystal polymer components are joined to one another.

6. The sensing element of claim 5 wherein said liquid crystal polymer components are ultrasonically welded to one another.

7. The sensing element of claim 1 wherein said conduit means is a copper tube.

8. The sensing element of claim 1 wherein said liquid crystal polymer component comprises a cap for said pressure vessel.

9. The sensing element of claim 8 wherein said cap is joined to a liquid crystal polymer cup.

10. The sensing element of claim 9 wherein said cap is ultrasonically welded to said cup.

11. The sensing element of claim 1 wherein said liquid crystal polymer is filled.

12. A pressure sensing element comprising a pressure vessel, conduit means for coupling said sensing element to an environment, a diaphragm contained within said pressure vessel and wherein said pressure vessel includes at least one structural component comprising a liquid crystal polymer and wherein said diaphragm comprises a polyimide film.

13. The sensing element of claim 12 wherein said polyimide film is a single convolution diaphragm, formed under heat and pressure.

14. The sensing element of claim 13 wherein a lubricant was applied to said film during its formation into a single convolution diaphragm.

15. A pressure sensing element comprising a pressure vessel, conduit means for coupling said sensing element to an environment, a diaphragm contained within said pressure vessel and a cup forming part of the pressure vessel, said cup being formed of a liquid crystal polymer, and wherein at least one additional structural component of said sensing element is also formed from a liquid crystal polymer, said additional component and said cup being ultrasonically welded to one another.

* * * * *